May 27, 1958  V. N. MAZUR  2,836,782
ADJUSTABLE SPEED MOTOR CONTROL CIRCUIT
Filed May 16, 1955
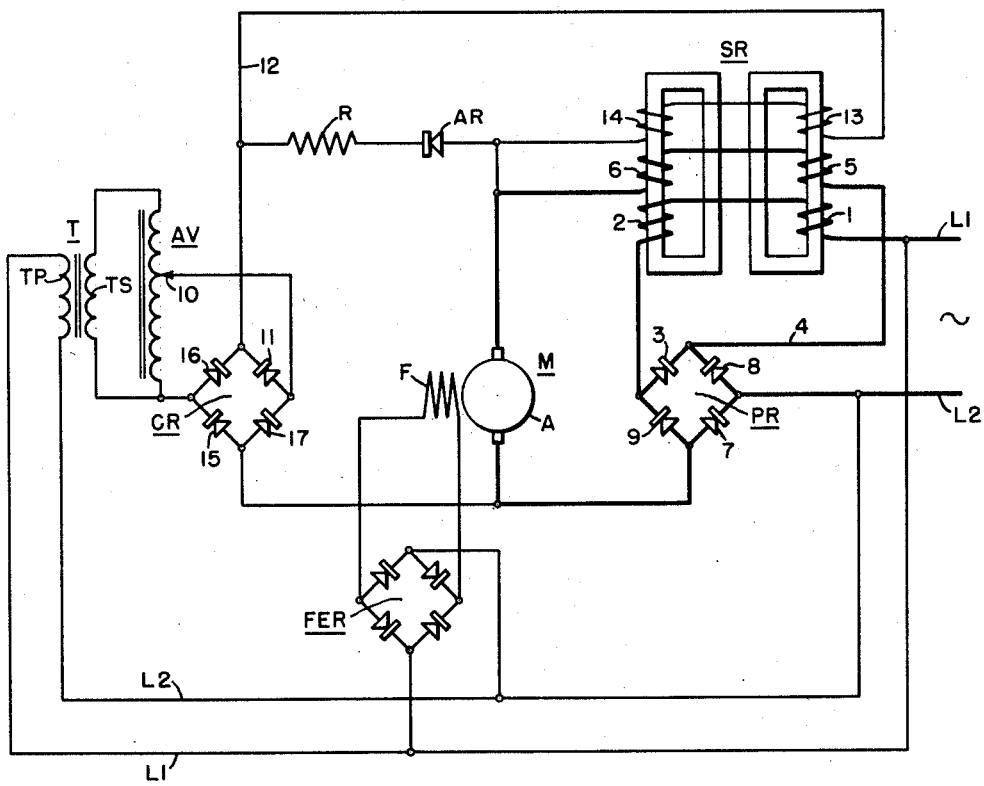
WITNESSES
INVENTOR
Victor N. Mazur.
BY
ATTORNEY

United States Patent Office 2,836,782
Patented May 27, 1958

2,836,782

ADJUSTABLE SPEED MOTOR CONTROL CIRCUIT

Victor N. Mazur, Tonawanda Township, Erie County, N. Y., assignor to Westinghouse Electric Corporation, East Pittsburgh, Pa., a corporation of Pennsylvania Application May 16, 1955, Serial No. 508,412

5 Claims. (Cl. 318—331)

My invention relates to an electric system of control and, more particularly, to a system of control for a direct current motor being supplied from an alternating current source of supply. I am aware that direct current motors have, on many occasions, been energized from alternating current sources by means of systems of control using electronic devices and in some instances by systems of control using electromagnetic devices. However, the devices of the prior art have not been found sufficiently reliable for some applications and have been rather complex in nature.

One broad object of my invention is the provision of a simple system of control for a direct current motor being supplied from an alternating current source of supply.

Another object of my invention is the use of electromagnetic devices in contradistinction to electronic devices for controlling a direct current motor from an alternating current source.

A more specific object of my invention is the provision of saturable reactor means and electric control means coacting to automatically compensate for the drop in speed with an increase in load to thus provide a selected speed for the motor, regardless of variations in load.

Other objects and advantages of my invention will become more apparent from a study of the following specification when done in conjunction with the single figure on the drawing diagrammatically illustrating an embodiment of my invention.

In the drawing, a direct current motor M is shown having an armature winding A and a field winding F with the field winding being connected to the field excitation rectifier FER which has its direct current terminals connected to the field winding and its alternating current terminals connected to the leads L1 and L2 connected to a suitable source of alternating current. For the particular application I have in mind, the excitation of the field winding is selected at a constant value. However, rheostatic means may readily be utilized in the field circuit to adjust the field to any one of a number of selected values.

The armature winding A of the motor is supplied from the alternating current leads L1 and L2 by the following circuits: When lead L1 is positive, a circuit is established from this lead through the alternating current, or main, windings 1 and 2 of the saturable reactor SR to the power rectifier PR, the rectifier section 3 of this power rectifier, conductor 4, load current responsive control windings 5 and 6 of the saturable reactor SR, the armature winding of the motor A, the rectifier section 7 to the negative lead L2. When lead L2 is positive, the circuit for the armature winding A may be traced through rectifier section 8 of the power rectifier PR, conductor 4, the windings 5 and 6, the motor armature A, the rectifier section 9 of the power rectifier, the windings 2 and 1 of the saturable reactor SR to lead L1.

In order to effectively control the speed of the motor, a reference voltage is applied to the motor armature winding by means of the variable voltage autotransformer AV through the control rectifier CR. The autotransformer is connected to the secondary winding TS of the isolating transformer T which has its primary winding TP connected to leads L1 and L2 which are in use connected to a suitable source of alternating current.

This reference voltage is applied to the motor through the control windings 13 and 14. The circuit for these control windings may be traced from the tap 10 through rectifier section 11 of the control rectifier CR, conductor 12, control windings 13 and 14, the armature winding of the motor M, rectifier section 15 of the control rectifier CR to the lower terminal of the autotransformer. When the lower terminal of the autotransformer is positive, the control windings 13 and 14 are energized by a circuit which is established through the rectifier section 16 of the control rectifier, conductor 12, control windings 13 and 14, the armature winding A of the motor M, rectifier section 17 of the control rectifier to the tap 10.

The magnitude of the control or error signal may be controlled at will by adjusting the tap 10 on the autotransformer AV, and this error signal thus appears across the control windings 13 and 14 as a direct current, but also contains alternating current impulses. It is thus evident that the auxiliary rectifier AR connected in series with the resistor R, with polarity as shown serves to recover the alternating current components which flow in the rectifying direction of the rectifier and thereby to increase the ampere turns in control windings 13 and 14, because the average direct current in the control winding is thus increased and the effect of a given error voltage is magnified so that the regulation is very much improved. For larger loads, the alternating current component of the error signal is additionally increased because of the phase shift between the reference and motor voltage.

In operation, speed setting is obtained by merely adjusting the tap 10 on the autotransformer, and since any change of voltage at the motor terminals by reason of a change of load will automatically be reflected in the circuit, including the control windings 13 and 14, it will be apparent that compensation for load is automatic since any voltage droop will increase the effect of the control windings 13 and 14 to cause additional current to flow through these control windings and thus to saturate the reactor to compensate for any increase in droop.

The control windings 5 and 6 are in the load circuit of the motor and thus carry the load current and provide additional compensation by reason of variations in the load on the motor.

My system of control is intended for use on applications where the motor is driving a constant torque load. However, it is not limited to this particular application. It will be noted that the control is extremely simple, and my experience with the control in actual use reveals that the speed setting can be made very accurate by the positioning of the tap 10 and that the speed selected will be maintained over a considerable range of changes of load on the motor.

While I have shown but one diagrammatic embodiment of my invention, it is to be understood that the embodiment is merely illustrative and that those skilled in the art, after having had the benefit of my teachings, may devise similar circuitry for accomplishing the novel results accomplished by my invention.

I claim as my invention:

1. In an electric system of control, in combination, a pair of supply terminals in use energized with alternating current, a full-wave power rectifier having a pair of alternating current terminals and a pair of direct current terminals, a saturable core reactor having a main winding and a pair of control windings, a direct current motor having a field winding, in use energized with direct current at any selected constant value, and having an armature winding, the main winding of the saturable core reactor being connected across one of the alternating current supply terminals and one of the alternating current terminals of the power rectifier and the other alternating current terminal of the power rectifier being connected to the other alternating current supply terminal, the motor armature winding being connected in a loop circuit including one of the control windings of the reactor and the direct current terminals of the power rectifier, an autotransformer having a plurality of taps for supplying a variable alternating voltage, said autotransformer being energized from said alternating current supply terminals, a full-wave control rectifier having its alternating current terminals connected across any selected pair of taps on the autotransformer and having its direct current terminals connected in a loop circuit including the other control winding of the reactor and the motor armature winding, and means, including a rectifier and an impedance, connected across said other control winding for eliminating the alternating current components, of the differential voltage appearing across said control winding, of a polarity opposite to the direct current component of said differential voltage.

2. In an electric system of control, in combination, a pair of supply terminals in use energized with alternating current, a full-wave power rectifier having a pair of alternating current terminals and a pair of direct current terminals, a saturable core reactor having a main winding and a pair of control windings, a direct current motor having a field winding, in use energized with direct current at any selected constant value, and having an armature winding, the main winding of the saturable core reactor being connected across one of the alternating current supply terminals and one of the alternating current terminals of the power rectifier and the other alternating current terminal of the power rectifier being connected to the other alternating current supply terminal, the motor armature winding being connected in a loop circuit including one of the control windings of the reactor and the direct current terminals of the power rectifier, an autotransformer having a plurality of taps for supplying a variable alternating voltage, said autotransformer being energized from said alternating current supply terminals, a full-wave control rectifier having its alternating current terminals connected across any selected pair of taps on the autotransformer and having its direct current terminals connected in a loop circuit including the other control winding of the reactor and the motor armature winding, and a rectifier and current limiting impedance connected in parallel with a second control winding.

3. In an electric system of control, in combination, a saturable reactor having a main winding and two control windings, a full-wave power rectifier, said main winding and input terminals of the rectifier being connected in series and in use energized with alternating current, a direct current motor excited at a selected constant value and having its armature winding connected in series with one of the reactor control windings and the output terminals of the rectifier, and circuit means for connecting a selected direct current reference voltage across the second reactor control winding and the motor armature winding, and means, including a rectifier and a resistor, for short circuiting half cycles of alternating current components, of the differential voltage appearing across said second control winding, of a polarity opposite the polarity of the direct current component of said voltage appearing across said second control winding.

4. In an electric system of control, in combination, a direct current motor excited at any selected value and having an armature winding the energization of which is to be controlled, a reactor having a main winding and a first control winding, rectifier means, said rectifier means, main reactor winding and first control winding being connected to be energized from a pair of terminals energized from a suitable source of alternating current and being connected to supply direct current to the motor armature winding, and a second reactor control winding, and circuit means for energizing the second control winding as a function of the voltage at the motor armature terminals and the magnitude of a reference voltage, and means for rectifying the alternating current components of the current flow resulting from the voltage appearing across said second control winding.

5. In an electric system of control, in combination, a direct current motor having a field winding excited at a selected constant value and having an armature winding the energization of which is to be controlled, a full-wave rectifier, a saturable core reactor having a main winding interconnected with the alternating current terminals of the rectifier and in use energized from a suitable source of alternating current, a first control winding for the reactor, said control winding being interconnected with the motor armature winding and with direct current supply terminals which in use are energized at selected voltage values to provide a speed control for the motor and which first control winding thus automatically compensates for voltage droop at the motor armature terminals from any cause, such as changes in load on the motor, and a second control winding for the reactor, said second control winding being interconnected with the direct current terminals of the rectifier and the motor armature to thus compensate in the output of the rectifier for motor load current, and means, including a rectifier, connected across said first control winding to add only half cycles of the alternating current voltage component, of the differential voltage appearing between said armature winding and said direct supply terminal of the same polarity as the direct current component of said differential voltage to said direct current component.

References Cited in the file of this patent

UNITED STATES PATENTS

| | | |
|---|---|---|
| 2,558,086 | Herchendroeder | June 26, 1951 |
| 2,558,094 | King | June 26, 1951 |
| 2,652,525 | Nichols | Sept. 15, 1953 |
| 2,675,513 | Malick | Apr. 13, 1954 |

FOREIGN PATENTS

| | | |
|---|---|---|
| 1,048,540 | France | Aug. 5, 1953 |
| 1,086,579 | France | Aug. 11, 1954 |

OTHER REFERENCES

"Magnetic Amplifiers in Industry," Westinghouse Eng., vol. 10, issue 5, pp. 201–205, September 1950.